Oct. 12, 1948.　　　　C. H. JORGENSEN ET AL　　　　2,451,205
ENGINE CONTROLLER
Filed Sept. 16, 1943　　　　　　　　　　　　　　　9 Sheets-Sheet 5

INVENTORS
Clarence H. Jorgensen and
William H. Taylor
BY
Spencer Hardman & Fike
their ATTORNEYS Oct. 12, 1948.  C. H. JORGENSEN ET AL  2,451,205
ENGINE CONTROLLER
Filed Sept. 16, 1943  9 Sheets-Sheet 7

INVENTORS
Clarence H. Jorgensen and
William H. Taylor
BY
Spencer Hardman & Fehr
their ATTORNEYS.

Fig. 20

Oct. 12, 1948.　　　C. H. JORGENSEN ET AL　　　2,451,205
ENGINE CONTROLLER
Filed Sept. 16, 1943　　　9 Sheets-Sheet 9

Fig. 21

Patented Oct. 12, 1948

2,451,205

UNITED STATES PATENT OFFICE 2,451,205

ENGINE CONTROLLER

Clarence H. Jorgensen and William H. Taylor, Anderson, Ind., assignors to General Motors Corporation, Detroit, Mich., a corporation of Delaware Application September 16, 1943, Serial No. 502,598

29 Claims. (Cl. 123—103)

This invention relates to fuel intake pressure controllers for supercharged internal combustion engines used on airplanes by which a selected pressure is maintained automatically by controlling the engine intake throttle valve. Manually operable means are effective to partly open the throttle valve and to select the pressure to be maintained and a servo-motor operates automatically to move the throttle valve to the position required to maintain the selected pressure at varying altitudes.

As in our copending application, Serial No. 483,438, filed April 17, 1943, and now abandoned, it is an object of the present invention to provide a throttle valve controller so constructed and arranged as to provide a manual control of the throttle supplemented by an automatic control such that the total amount of throttle movement effected manually and automatically brings the throttle to wide open position at critical altitude throughout a range of pressure selections extending from the high pressures specified for take-off and emergency to substantially lower pressures specified for cruising.

In the disclosed embodiment of the present invention this obect is accomplished by the use of a floating or differential lever, the fulcrum of which is moved by the servo-motor. One arm of the differential lever is connected with the throttle valve and the other arm provides a cam slot which receives a roller carried by a lever which is moved by a manually operated control lever which selects the pressure to be maintained. The operation of the control lever to select the pressure causes the roller to cooperate with the slotted arm of the differential lever in a manner such that the throttle valve will be moved into a position required by manual control and such that a certain initial relation between the roller and cam slot will be established. The contour of the cam slot is such that, when the servo motor moves the fulcrum of the differential lever to cause the throttle valve to be positioned automatically to maintain a selected pressure, the total opening movement of the throttle valve, as effected manually by the main control lever and as effected automatically by the servo-motor will be sufficient to bring the throttle valve into wide open position at critical attitude over a range of pressure selections including those pressures required for take-off and emergency and also for cruising.

This invention relates also to automatic controllers for aircraft engines, one example of which is disclosed in the copending application of Dolza et al., Serial No. 449,918, filed July 6, 1942. That controller comprises a pressure regulator which is manually controlled by a single main control lever operated by the pilot for setting the pressure regulator to maintain a selected manifold pressure with changing altitude, and means set by the control lever for controlling the setting of the propeller governor whereby a certain engine or propeller R. P. M. is selected in coordinated relation of the selection of manifold pressure. Hence there is a predetermined schedule of pressure and corresponding speeds. In effect, the controller provides a predetermined schedule of power output corresponding to various positions of the main control lever.

As in the copending application of Dolza et al., Serial No. 498,968, filed August 17, 1943, it is an object of the present invention to provide means controlled by the pilot for modifying the power schedule corresponding to the positions of the main control lever without changing the setting of that lever. For example, when ferrying an airplane more power may be required than the regular schedule calls for. Therefore, the present invention provides for so modifying the schedule that increased power may be obtained without changing the setting of the control lever. The disclosed embodiment provides for increasing the pressure selection within certain limits of the regular schedule so that the brake mean effective pressure (B. M. E. P.) of the engine will be increased to give the additional power while the setting of the main control lever is not changed. Hence, the schedule of B. M. E. P. and speed can be altered at will by the pilot or returned to the regular schedule by operating an auxiliary lever. In this connection a further object is to provide automatically for the return to the regular schedule of pressure in case the pilot moves the main control lever to certain positions and fails to return to regular schedule by moving the auxiliary lever to normal or non-controlling position. The certain positions referred to are, for example, the "idle" and "emergency" settings of the main control lever, since it is desired that the regular schedule be adhered to in all events when the engine is idling or when emergency power is required.

A further object of the present invention is to provide for a reduction of the selected pressure without changing the setting of the main control lever when it is desired to test the magnetos which provide the ignition for the engine. This object is accomplished by operating in a certain manner the means used to increase the pressure above the normal schedule.

Further objects and advantages of the present invention will be apparent from the following description, reference being had to the accompanying drawings wherein a preferred embodiment of the invention is clearly shown.

Figure 5:
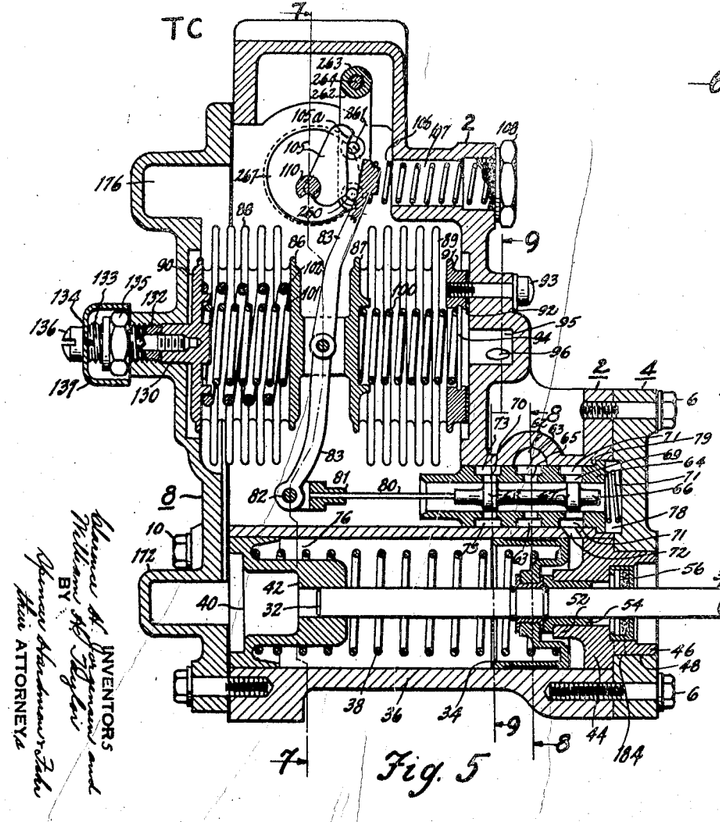
Fig. 5 is a sectional view taken on line 5—5 of Fig. 4.

The frame work of the device TC comprises two housings indicated generically by the reference numbers 2 and 4 which are secured together in any suitable way, as by bolts 6. The housing 2 is provided with mounting plate 7 adapted to be secured to the engine or to some other suitable supporting means. The pressure operated mechanism for controlling the position of the throttle valve is located within the housing 2 and the mechanism for controlling the engine or propeller R. P. M. is located within the housing 4, these mechanisms operating to position the several instrumentalities controlled thereby through the medium of a system of levers principally located outside the two housings and supported thereby. Referring to Fig. 5, it will be noted that screws 10 secure to the housing 2 end plate or head 8 in which certain fluid passages are formed, for a purpose later set forth.

Figure 21:
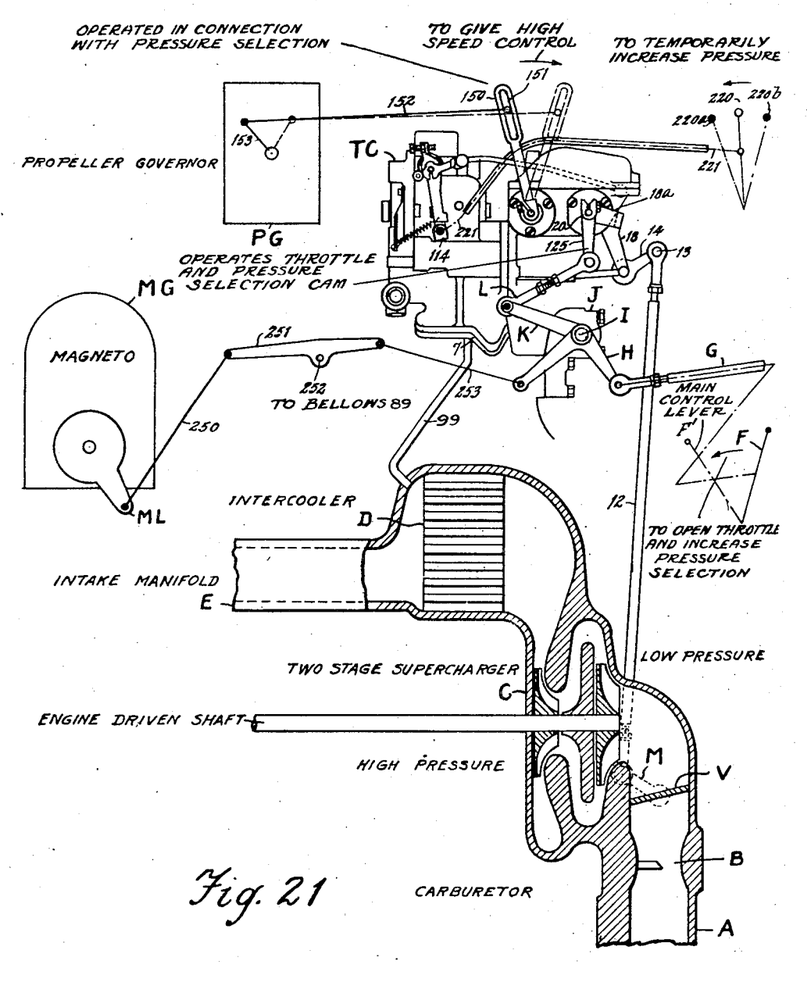
Fig. 21 is a diagram of connections between the controller, cockpit throttle lever, throttle valve, speed governor and magneto.

Referring to Fig. 21, pipe A leads from an airscoop (not shown) to carburetor B connected with supercharger C by a pipe controlled by throttle valve V. From the supercharger C, the fuel mixture passes through intercooler D to engine intake manifold E. Valve V is manually controlled by pilot throttle lever F connected by link G with lever H attached to shaft I journaled by bracket J. To shaft I is attached a lever K connected by adjustable link L with the main control lever 125 of the throttle controller TC.

Figures 14, 14A, 15, 16:
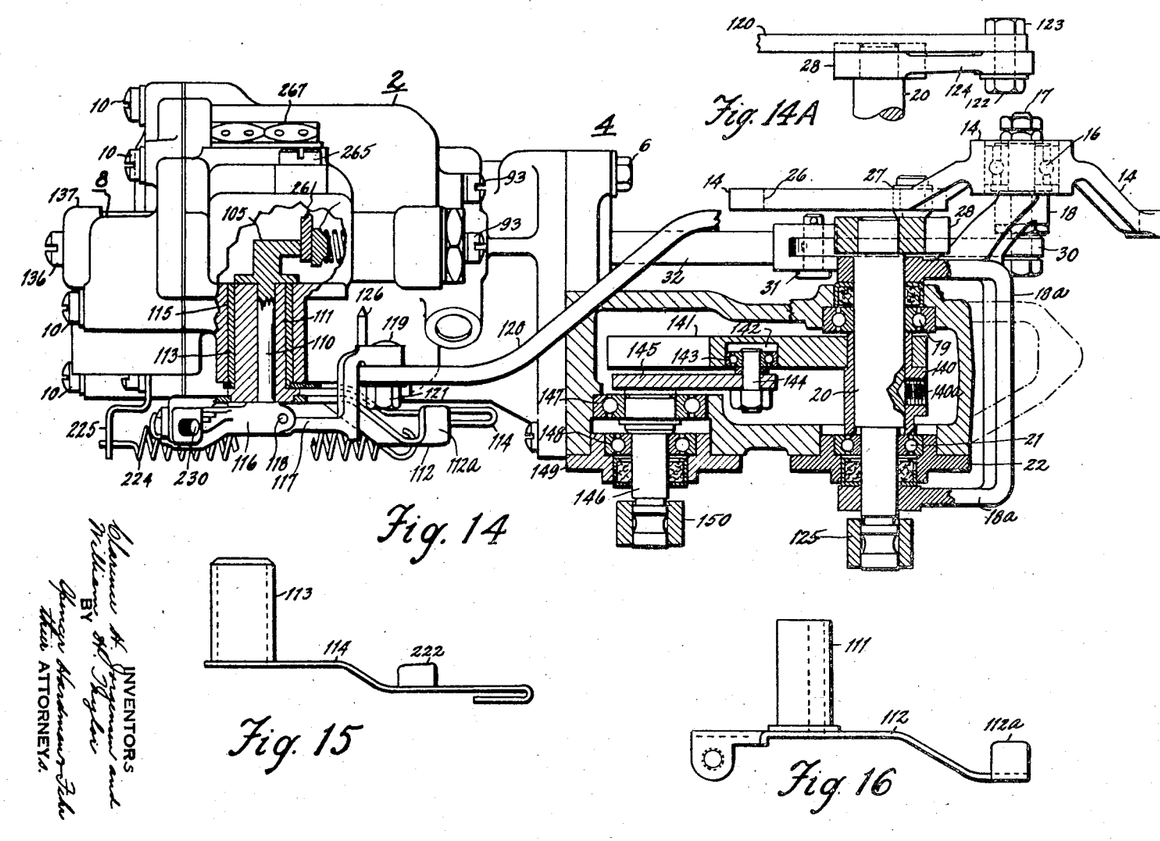
Fig. 14 is a plan view partly in section, the section being taken on line 14—14 of Fig. 1.
Fig. 14a is a detail plan view showing one end of an operating shaft and levers connected thereto.
Figs. 15 and 16 are separate views of levers, the hubs of which are shown in section in Fig. 14.

Lever 125 is carried by shaft 20 which, as shown in Fig. 14, extends through the housing 4 and is supported by bearings 19 and 21 carried by housing 4 and a plate 22 attached by screws 23. Screws 24 secure to housing 4 a cover 25.

Figure 6:
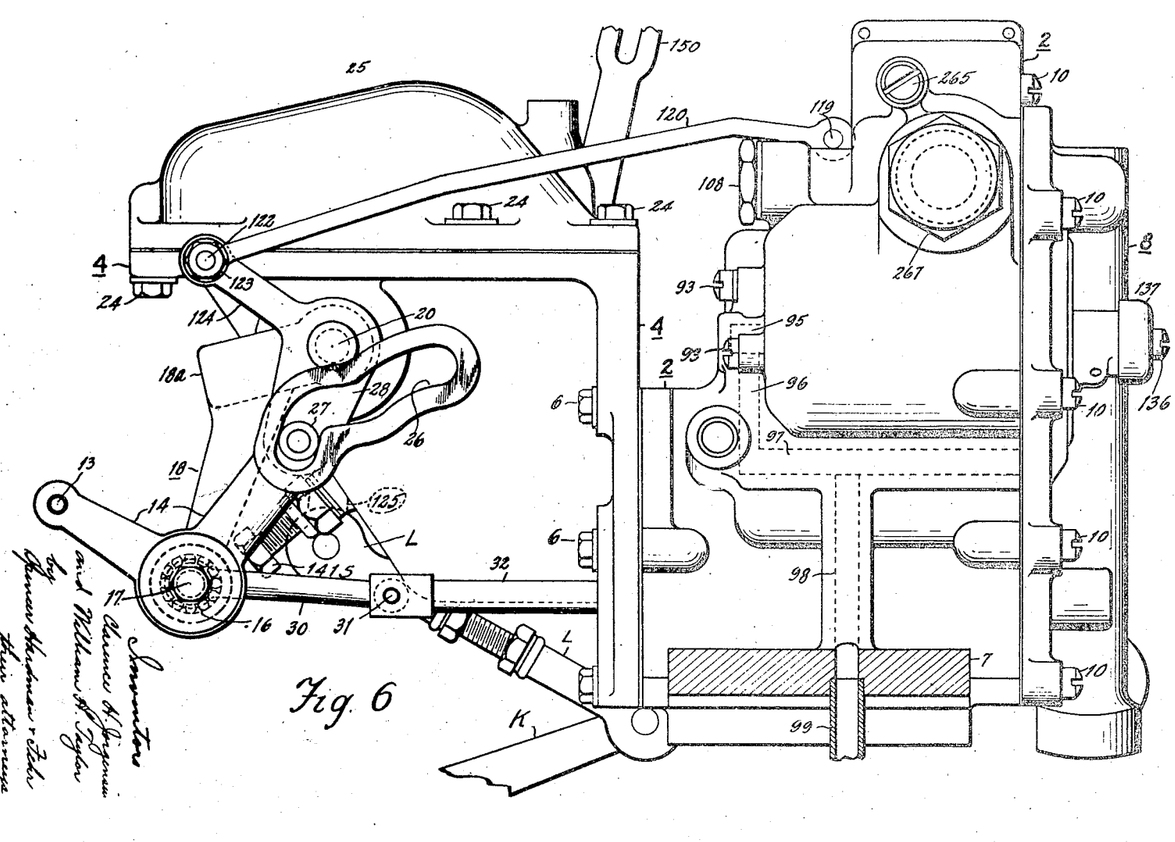
Fig. 6 is a side elevation looking in the direction of arrow 6 of Fig. 4.
Figure 7:
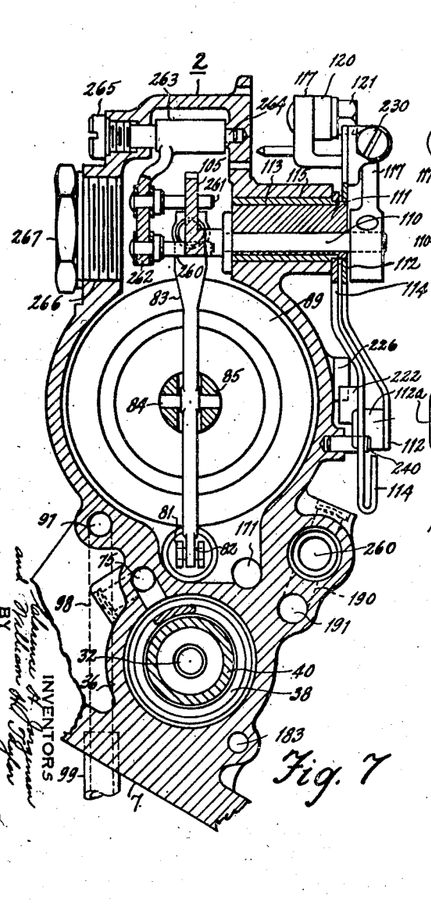
Figs. 7, 8 and 9 are sectional views taken, respectively, on line 7—7, 8—8 and 9—9 of Fig. 5.

Throttle valve V (Fig. 21) is rotated by an arm M connected by link 12 with stud 13 on a differential bell crank lever 14 which is enlarged to form a hub 15 to receive the outer race of a ball bearing 16 the inner race of which is supported by a stud 17 carried by an arm 18 extending from a yoke 18a journaled in shaft 20 but not connected therewith. An arm of lever 14 (Fig. 6) provides a cam slot 26 which receives a roller 27 pivotally supported by a lever 28 attached to shaft 20.

The stud 17 provides a pivotal connection between differential lever 14 and a link 30 pivotally connected at 31 with a piston rod 32 attached to a piston 34 (Fig. 5) slidable in a cylinder 36 formed in the housing 2. The piston 34 is normally held in the position shown in Fig. 5 by a spring 38 located between the piston 34 and a cylinder head 40 which is fixed in one end of the cylinder 36 and has a sleeve 42 formed at the center thereof to provide a bearing in which one end of the piston rod 32 slides. Another cylinder head 44 is located in the opposite end of cylinder 36 and provides an annular extension 46 received by a hole 48 in housing 4. The cylinder head 44 has a centrally disposed annular extension 52 in which is received a bushing 54 which provides a second bearing for the piston rod 32. A suitable seal 56 is supported within the extension of head 44 to prevent any leakage of fluid around the piston rod.

Figures 1, 2, 3:
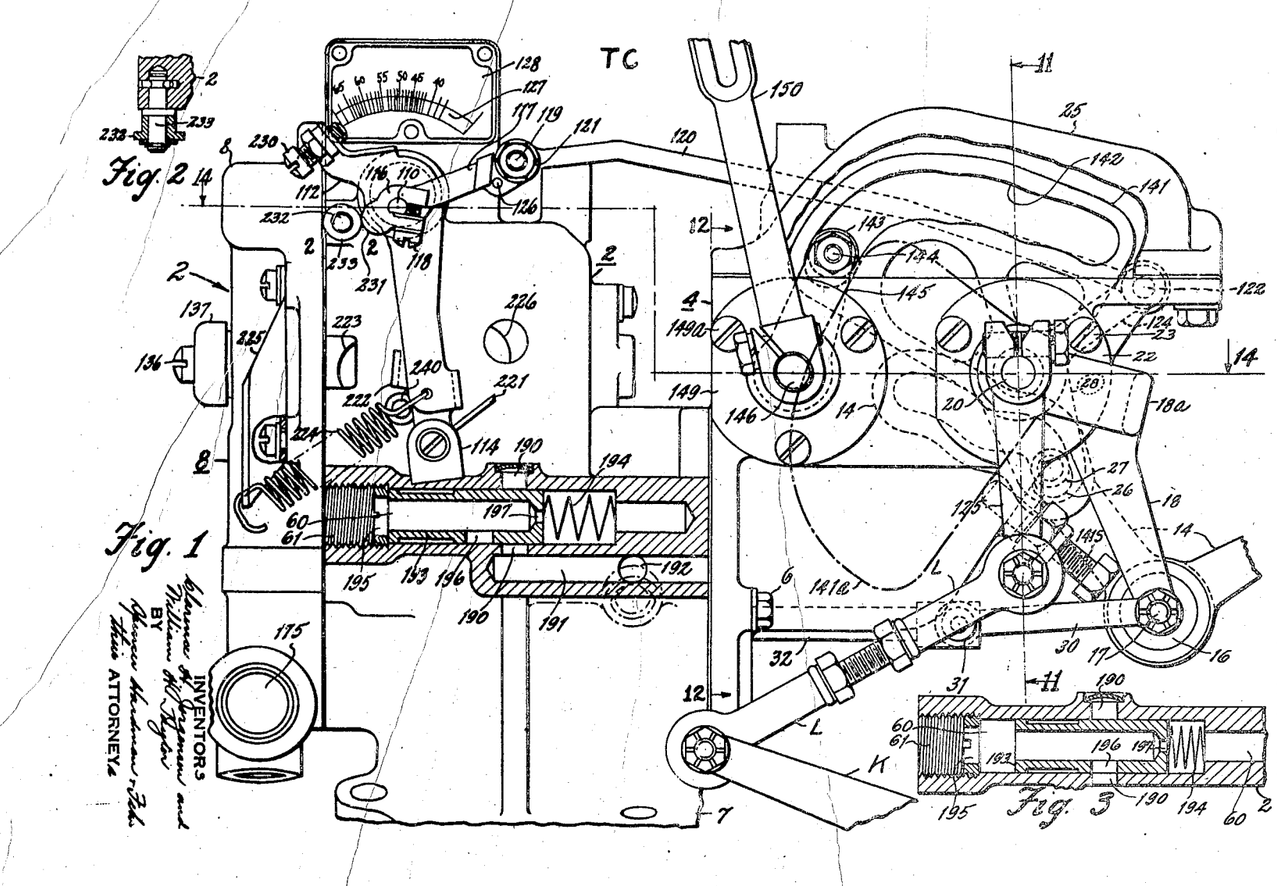
Fig. 1 is a side elevation of the controller with parts of the housing in section on line 1—1 of Fig. 6.
Fig. 2 is a fragmentary sectional view on line 2—2 of Fig. 1.
Fig. 3 is a fragmentary view including the portion of Fig. 1 shown in section and shows a valve in a different position.
Figure 4:
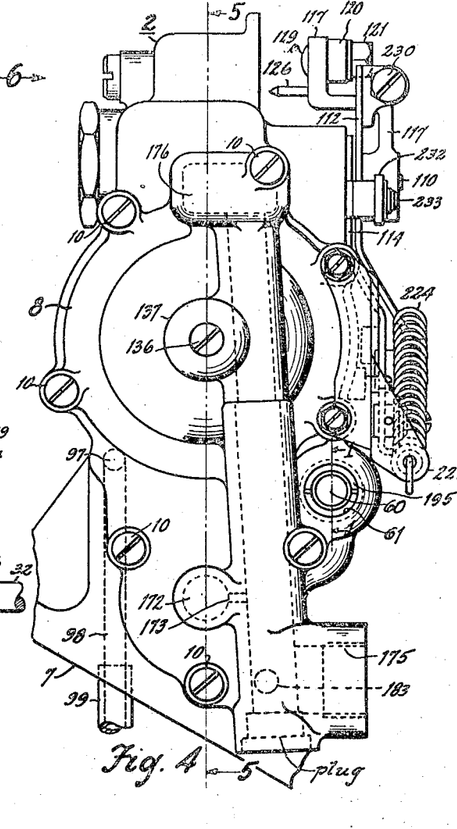
Fig. 4 is an end view taken in the direction of arrow 4 of Fig. 1.
Figure 8:
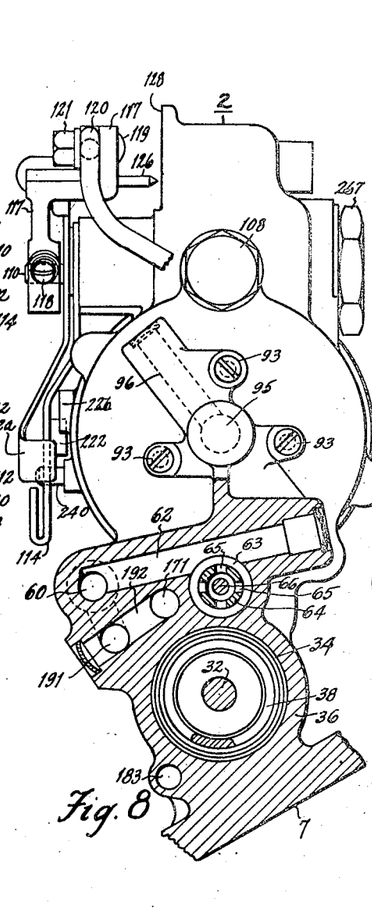
Figure 9:
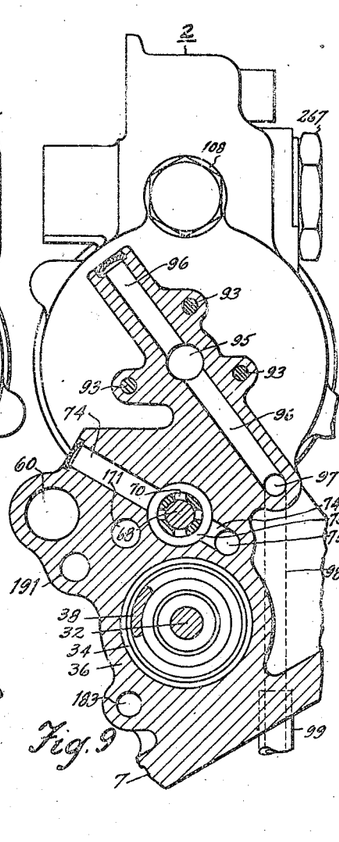

The piston 34 and cylinder 36 constitutes a servo motor for automatically operating the differential lever 14 to move the throttle valve V of the carburetor. Oil pressure as controlled by an automatic valve, provides the motive power for moving the piston. To effect movement of the piston 34, oil under pressure is supplied to a passage 60 (Figs. 1, 7, 8 and 9) provided by housing 2 from an oil pressure source connected at 61 (Figs. 1 and 4). Passage 60 leads to passage 62 (Figs. 5 and 8) connected with an annular groove 63 in a tubular valve guide 64 connected with the interior thereof by a plurality of ports 65 located in an annular row. Guide 64 supports a valve 66 having lands 67 and 68 which control connection between ports 65 and either of the groups of valve guide ports 69 and 70, each group being a plurality of ports as shown in Fig. 8. One of the ports 69 is wider than land 67 to provide for restricted circulation of oil through the controller even when land 67 is located as shown in Fig. 5. Ports 69 lead to valve guide groove 71 leading through passage 72 to the right side of piston 34. Ports 70 lead to valve guide groove 73 leading through passages 74, 75 and 76 (Fig. 10) to the left side (Fig. 5) of piston 34. A spring 77 located in a pocket 78 between housing 2 and 4 urges the guide 64 against a shoulder 79 provided by housing 2.

Valve 66 is connected by rod 80, clevis 81 and pin 82 with a lever 83 pivoted on a pin 84 carried by a bridge 85 connecting movable end plates 86 and 87 of metal bellows 88 and 89, respectively, having relatively fixed end plates 90 and 91, respectively. Screws 93 secure the plate 91 to housing 2 with a sealing gasket 92 between them. The interior of bellows 89 is connected either with a supercharger housing or with the engine intake manifold through apertured disc 94 (carried by plate 92), pocket 95, and cross passage 96, horizontal passage 97 and vertical passage 98 extending to the bottom of plate 7 (Fig. 6) and connected with a pipe 99 as shown in Fig. 4 and pipe 99 leads to the engine intake manifold E. Bellows 88 is evacuated so that the bellows system is compensated for changes in atmospheric pressure. It is responsive only to changes in engine intake pressure. Spring 100 in bellows 90 and springs 101 and 102 in bellows 88 are so constructed and calibrated that the relation of the movements of the pin 84 to changes in engine intake pressure is substantially a fixed linear relation.

The location of valve 66 is determined partly by the pressure within bellows 89 and partly by a pressure selecting cam 105 toward which the upper end of lever 83 is urged by a spring 106 located in a recess 107 provided by housing 2 and retained by a plug 108, there being an idler pin 260 located between the cam 105 and the lever 83. Cam 105 is attached to a shaft 110 which is journaled in the hub 111 of a lever 112 (Figs. 8 and 14) which is journaled in the hub 113 of a lever 114 which is journaled in the bore 115 (Fig. 14) of housing 2. The hubs 111 and 113 are concentric, but shaft 110 is eccentrically supported by hub 111 for a purpose to be described. Shaft 110 is gripped by the clamping hub 116 of a lever 117, the hub being tightened by a clamping screw 118. Stud 119 fixed to lever 117 provides a pivotal connection with a link 120 which is retained upon the stud 119 by a nut 121. Link 120 is connected by a screw 122 (Figs. 6 and 11), retained by nut 123, with a lever arm 124 integral with arm 18 (Fig. 11) which through the shaft 20 is manually operated by the main control lever 125. The location of selector cam 105 by the main control lever 125 operating through the lever 117 selects pressures such as from 25 to 65 inches of mercury, absolute, for example which are indicated by a pointer 126 or lever 117 which moves past graduations 127 on a dial plate 128 carried by housing 2.

The device is calibrated by moving lever 117 to indicate the most important pressure, for example, war emergency pressure 60" Hg. That same pressure is applied in bellows 89. An adjustment of the pin 84 is made until the piston 34 is in a balanced condition, that is, floating and not touching either end of the cylinder. In order to adjust the location of pin 84 the bellows plate 90 has a stem 130 received by a tubular boss in the plate 8 and which provides a tapped hole 132 for receiving an adjustable stop screw 133 having a screw driver blade slot 134 and locked by a nut 135. Screw 133 has a plain central bore receiving a screw 136 which retains a cover cup 137 and which threads into the stem 130 of plate 90 and which will draw the stem against the stop screw 133. To make the adjustment, remove the screw 136 and cover 137, loosen nut 135 and apply oil pressure at passage 60. If piston 34 moves inwardly to left position in cylinder 36, turn screw 133 out until the piston 34 just begins to move right. This will indicate that the valve lands 67 and 68 have moved slightly to the left of the ports 69 and 70. Turn screw 133 slightly in the opposite direction until movement of piston ceases. This calibration should take place while the controller is being vibrated in order to cancel out frictional hysteresis. If, instead of moving piston inwardly when the oil pressure is applied in passage 60, the piston 34 stays in the outward position, shown in Fig. 5, the screw 133 is turned inwardly until the piston starts moving to the left. Then the screw is turned slightly outwardly until movement of the piston ceases. After the adjustment is made, nut 135 is tightened and cover 137 and screw 136 are replaced and sealed.

Figures 10, 11, 12, 13:
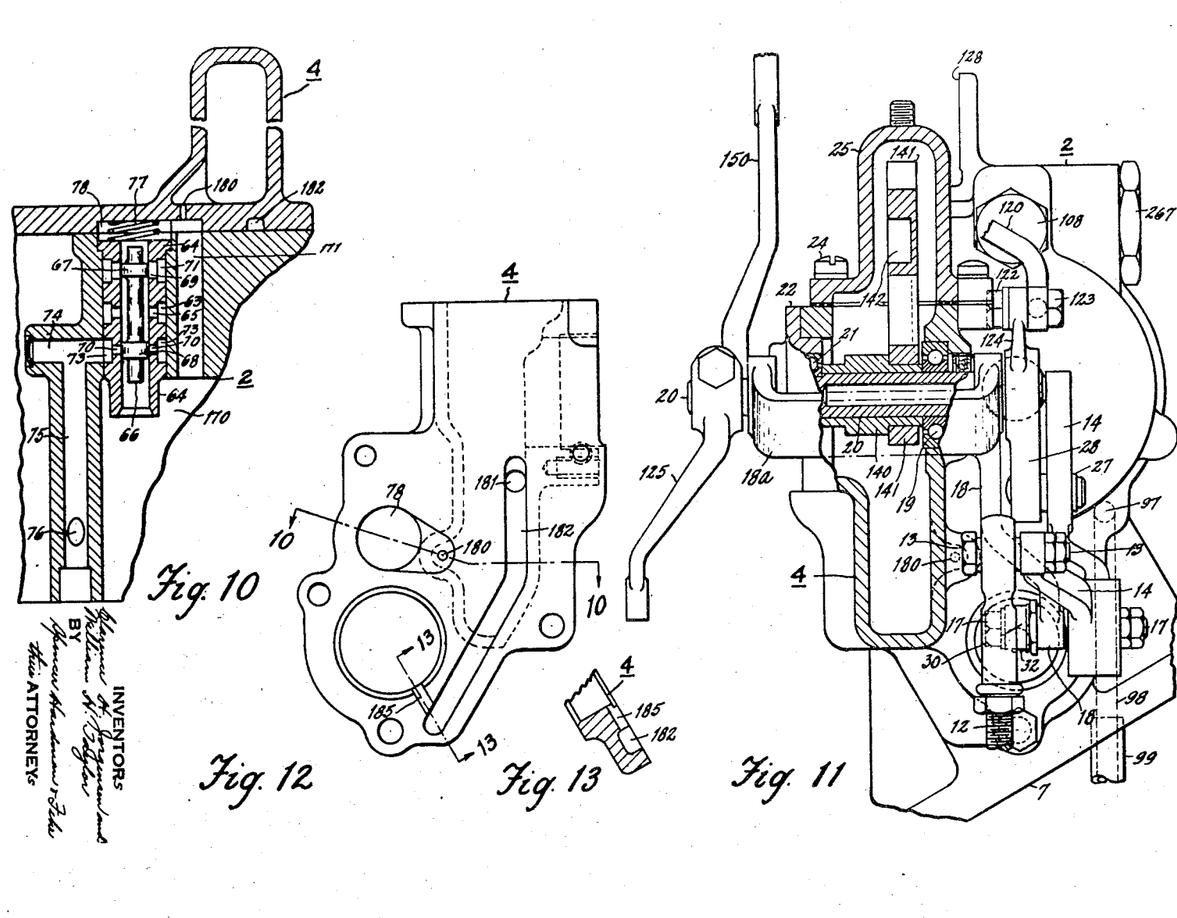
Fig. 10 is a fragmentary sectional view on line 10—10 of Figs. 7 and 12.
Fig. 11 is an end view partly in section, the section being taken on line 11—11 of Fig. 1.
Fig. 12 is a view of one of the housing members taken on line 12—12 of Fig. 1.
Fig. 13 is a sectional view on line 13—13 of Fig. 12.

The functions of the main control lever 125 are to control the throttle valve V sufficiently to make a take off or to make a safe landing in case of failure of oil pressure in the controller servomotor, to move cam 105 to select the intake pressure to be maintained, and to control engine speed in coordinated relation to pressure selection. This latter function is performed by a mechanism operated by shaft 20 to which the lever 125 is connected. Referring to Figs. 1, 11, and 14, shaft 20 drives the hub 140 of a cam plate 141 having a cam slot 142 which receives a ball bearing follower 143, the inner race of which is attached by a screw 144 to an arm 145 driving a shaft 146 journaled in bearings 147 and 148 mounted respectively in housing 4 and plate 149 attached to housing 4 by screws 149a (Fig. 14). Lever 150 (Fig. 21), driven by shaft 146, supports a stud 151 adjustable radially thereof and secured thereto in any suitable manner in order that the throw of the lever may be adjusted. Stud 151 is connected by a link 152 with the control lever 153 of a propeller governor indicated diagrammatically by the letters PG. The relation of movement of lever 125 and governed engine speeds is shown by line O—P—Q—R—S—T of Fig. 20. The lever 153 moves clockwise in Fig. 21 for greater speed.

The propeller governor may be of any standard design that is effective to automatically change the propeller pitch in order to maintain a substantially constant speed. Its specific construction is not material and it may be of the same design as used with any of the standard propellers, the pitch of which is automatically changed in response to change in speed and which is provided with a control member which may be set to select the speed which is to be maintained by the pitch change. An example of a device of this character is shown in the patent to Blanchard et al., No. 2,307,102, in which the control member for the governor is indicated by the reference numeral 130 and may be adjusted manually to determine the speed to be maintained. According to the present invention the control element of the governor is connected to the pressure regulator so that the action of the governor is controlled in coordinated relation with the pressure selection.

Cam plate hub 140 (Fig. 14) is connected with shaft 20 by a set screw 140a. The cam plate and its hub may be removed and replaced by a cam plate having a different cam groove which will provide a different schedule of relations between selected pressure and governed engine speeds.

Figure 17:
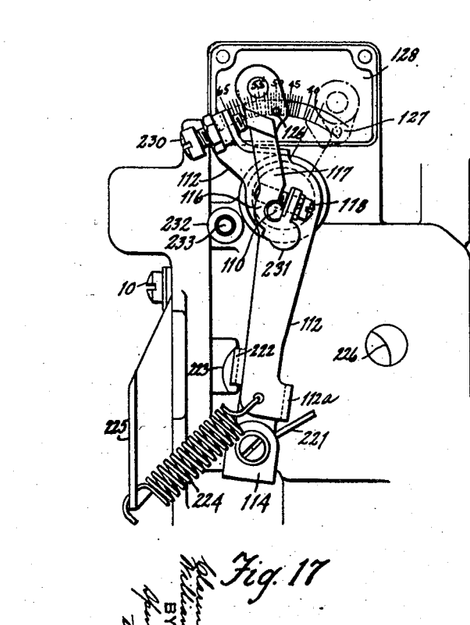
Figs. 17, 18 and 19 are fragmentary side views of parts shown in Fig. 1, these parts being shown in different positions.

During operation of the controller the housing 4 contains oil into which the cam plate 141 dips as it is moved by the lever 125; and a bellows chamber 170 (Fig. 5) in housing 2 contains oil in order to dampen vibration of the bellows. Oil for these purposes is principally that which is discharged from the servo cylinder 36. When valve 66 is moved to the right from the position shown in Fig. 5 to connect ports 65 and 69 in order that the piston 34 will move left, the oil on the left side of the piston will be discharged through passages 76, 75, 74 (Fig. 10), groove 73 (Fig. 5) and through the guide 64 to the chamber 170. When valve 66 moves left from the position shown to connect ports 65 and 70, oil at the right of the piston 34 is discharged through passage 72, groove 71, guide 64, pocket 78, a passage 171 (connected with pocket 78 as shown in Fig. 10) and into chamber 170. Chamber 170 drains into a pocket 172 in plate 8 connected by a restricting hole 173 with a drain 174 (Fig. 4) with which a pipe may be connected at 175. During operation of the controller, oil rises in the chamber 170 and overflows through passage 176 and passes down the drain 174. Some of the oil received by pocket 78 flows through a small hole 180 (Fig. 10) in housing 4. The level of oil in housing 4 will rise during operation and the excess will overflow through a hole 181 (Fig. 12) and down a channel 182 which communicates with a passage 183 in housing 2 which leads to drain 174 (Fig. 4). Oil trapped by the oil seal 56 (Fig. 5) flows through a hole 184 in part 46 and through a groove 185 of housing 4 (Fig. 17) connecting with the groove 183.

Generally the leakage of oil past the land 67 and through the oversize port 69 (Fig. 5), when valve 66 is in the normal position shown, will provide for oil circulation at a rate sufficient to avoid congealing of the oil and allow oil to circulate to provide for immediate operation when the engine is cold. However, if the foregoing procedure should prove inadequate, a viscosity controlled oil by-pass can be provided. As shown in Figs. 1, 7, 8 and 9, high pressure oil inlet passage 60 is connected by passages 190, 191, 192 and 171 with bellows chamber 170. This by-pass is controlled by a viscosity controlled valve 193 urged by a spring 194 against a screw ring 195 threaded into passage 60 and holds the valve 193 in such position that its port 196 is out of alignment with passage 190. Valve 193 has a flow metering orifice 197 of such size that when the oil is at a temperature which is satisfactory for the operation of the controller servo-motor, the oil will readily pass through the orifice 197 without causing such compression of spring 194 as would cause the by-pass to be opened. When the oil is too cold for satisfactory operation its viscosity is so great that, when it is being forced into passage 60 from the engine oil pressure system, orifice 197 so retards the oil that valve 193 moves to the position shown in Fig. 3 to open the by-pass by connecting valve-side-passage 196 with passage 190. Then the oil merely circulates through the bellows chamber while its temperature rises during the warming up of the engine.

Figure 20:
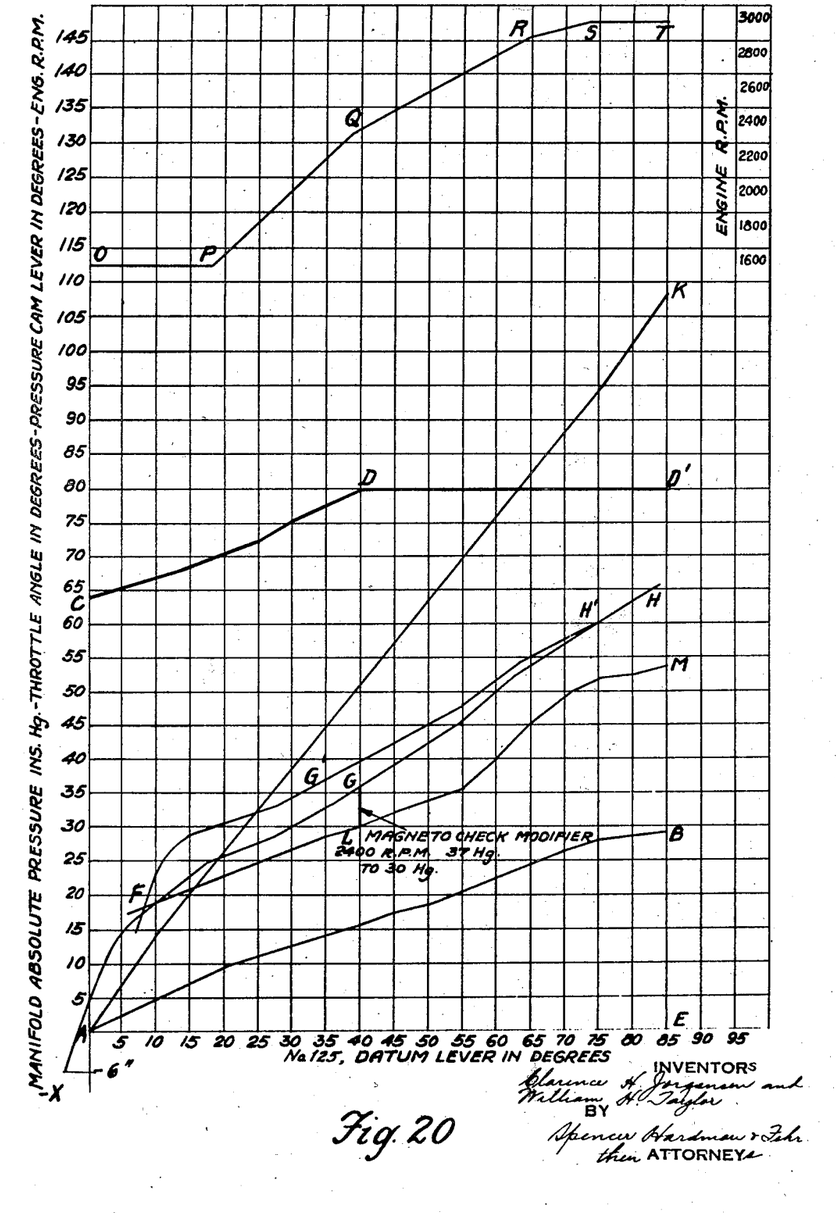
Fig. 20 is a chart illustrating the operation of the controller shown in the preceding views.

When the engine is id'ing, the valve V and movable parts of the controller will be located as shown in Figs. 1, 5, 6 and 21. The idle position of valve V is indicated at A in Fig. 20. As the lever 125 is moved clockwise in Fig. 6, throttle valve V opens since the differential lever 14 moves left and rotates counterclockwise, clockwise in Fig. 21, the piston rod 32 remaining stationary. Line A—B of Fig. 20 represents the relation of opening of the throttle valve V and movement of lever 125 which is limited in its clockwise rotation (Fig. 6) by the cam plate 141 striking an adjustable stop screw 141S (Fig. 1) supported by the housing 4. The maximum manually effected opening of valve V is B—E which, for example, may be 30° of the total of 80° opening movement of a valve having its idle position 10° from a plane at right angles to the axis of fuel passage as shown in Fig. 21. The relation of selected pressure to the setting of lever 125 is represented by line F—G—H of Fig. 20. If the controller servo did not operate, the intake pressures, actually obtainable at sea level by manually opening valve V according to line A—B, are represented by line F—L—M. Since line F—G—H is above line F—L—M it is apparent that the servo must effect an additional opening movement of valve V in order to maintain the pressure selected for flight. As the altitude increases the servo operates to open valve V further; and, as the altitude decreases the servo operates to move valve V toward closed position. The operating range of automatic control of the throttle valve is from about the 15° position up to the 85° position of datum lever 125. Line C—D—D' represents the throttle opening effected by the combination of manual operation (represented by A—B and full servo movement). The portion D—D' is flat and indicates that for datum lever 40° position to 85° position, giving pressure selections 37" to 66" Hg, absolute, throttle valve V is fully opened by manual movement plus full servo movement. This means that the throttle V will be wide open at critical altitude over a range of pressure selections as low as 37" required by cruising at a low speed up to 66" required for emergency operation.

It is desirable that the throttle be fully opened at critical altitude in order to avoid loss of power due to fuel passage restriction by the valve when at less than wide open position. This feature is obtained by establishing the correct relations between the valve operating members and datum cam, and particularly between levers 14 and 28 as provided by the variable mechanical connection provided by cam slot 26 of lever 14 and roller 27 carried by lever 28.

Under certain conditions as when "ferrying" a plane, it is desirable to change the regular pressure schedule F—G—H to schedule F—G'—H' (Fig. 20). For this purpose the pilot moves a modifier lever 220 in the cockpit to position 220a. Motion is transmitted by a flexible cable 221 to lever 114 to cause it to move from the position shown in Fig. 1 to that shown in Fig. 17, wherein lever lug 222 engages a stop lug 223. Since lever 112 is connected by a spring 224 with a bracket 225 supported by the housing 2, lever 112 follows along with lever 114, provided lever 117 is in a position intermediate "idling" and "emergency." Clockwise movement of lever 112 and its hub 111 causes cam 105 (eccentrically supported by hub 111) to move left away from lever 83 to increase the pressure selection, just as counterclockwise rotation of shaft 110 would increase pressure selection. If lever 114 is moved the full distance between normal position shown in Fig. 1 and the modified position shown in Fig. 17, the pressure schedule is raised to F—G'—H' of Fig. 21. For lesser movements of the lever 114 clockwise from normal position, the pressure schedule is raised a correspondingly lesser amount.

Figure 18:
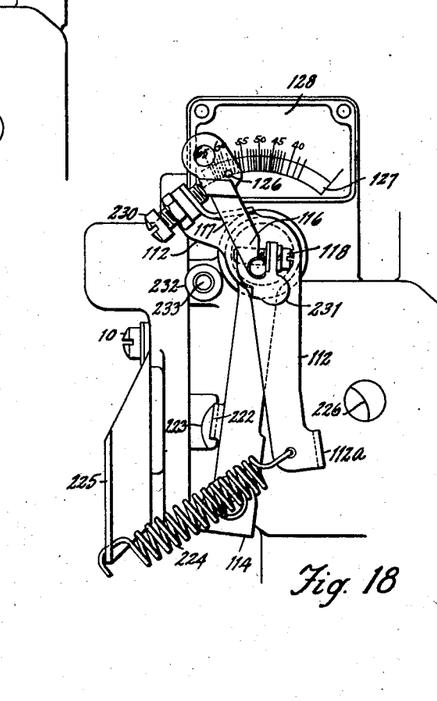
Figure 19:
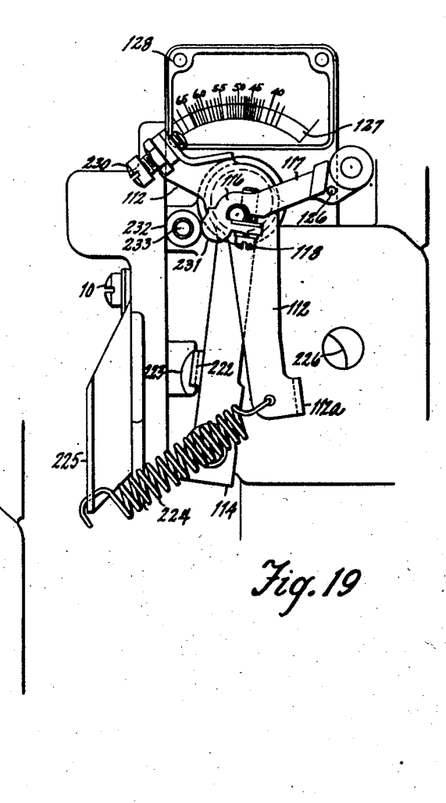

The controller provides means for returning automatically to regular schedule F—G—H when the lever 125 is moved either to "idle" or "emergency" pressure selecting positions. When lever 125 is moved to emergency position for a pressure selection of 60" Hg, for example, to cause lever 117 to carry its pointer 126 to the 60" mark on graduations 127 (Fig. 18), lever 117 engages a screw 230 adjustably secured to lever 112 and causes it to move from the modified position shown in Fig. 17 to the normal position shown in Fig. 18 while spring 224 stretches. When lever 125 moves lever 117 to idle position (Fig. 19), a cam 231 on lever 117 presses against a roller 232 pivoted on a stud 233 fastened to housing 2 and forces the axis of shaft 110 back to normal position shown in Figs. 1 and 5, thereby rotating hub 111 and lever 112 to normal position as shown in Fig. 19.

The normal position of lever 114 is initially established by a removable pin 240 carried by housing 2 (Fig. 1). After the installation has been made during which lever 114 is connected with the pilot's modifier lever at 220, the pin 240 is removed. The friction between the lever 220 and its quadrant (not shown) is sufficient to retain the lever 114 in its normal position against the pull of spring 224.

The modification of pressure selection according to line F—G'—H' can be made while the throttle lever F and main control lever 125 of the throttle controller TC remains in a position to give a pressure selection between 10" and 60" according to line F—G—H. When the modifier lever 220 (Fig. 21) is returned to normal position the regular schedule of intake pressures according to line F—G—H and engine governed speeds according to line O—P—Q—R—S—T of Fig. 20 is resumed.

Another function of the lever 220 is to effect a reduction of the pressure selected by lever 125 when moved by lever F into a certain speed setting position for the purpose of checking the magneto MG (Fig. 21) whose timer lever ML is connected with lever F by link 250, lever 251 pivoted at 252, and link 253 connecting levers 251 and H. For magneto checking, it is specified for a particular type of engine, for example, that the engine governed speed shall be 2400 R. P. M. and the engine intake pressure shall be 30" Hg. Lever 125 is moved by throttle lever F into the 40° position, which causes such movement of cam 141 that the governed engine speed is 2400 R. P. M. The corresponding pressure selection according to line F—G—H (Fig. 20) is 37" Hg which is too high. Lever 220 is moved to position 220b (Fig. 21) which causes lever 114 to move counterclockwise from the normal position shown in Fig. 1 until the lug 222 engages top 226 on housing 2. Lever 112 moves counterclockwise with lever 114 since its lug 112a is engaged by lever 114. The hub 111 of lever 112, which eccentrically supports the shaft 110 of cam 105, rotates to cause cam 105 to move bodily toward the right in Fig. 5 to effect a decrease in pressure selection from 37" to 30" Hg, as represented by line G—L in Fig. 20. Movement of lever 220 from magneto check position 220b to normal position restores the pressure selection to the normal schedule.

Throttle lever F by acting through the main control or datum lever 125 controls engine power output according to a predetermined schedule of relations between pressure selection as represented by line F—G—H and selections of governed speed as represented by line O—P—Q—R—S—T which represents the shape of the cam slot 142 (Fig. 1). For mechanical reasons, it is desirable that the slot 142 should not have any surfaces which are excessively steep. A cam slot 142 which provides for changes in governed speed without excessive mechanical effort can be obtained by making the pressure selections vary according to the line F—G—H which is composed of increments having such variation in shape that the datum cam 105 must have the contour shown in Fig. 5 which a lever, such as lever 83 having a flat end, could not follow. Because the relation of movements of lever pin 84 to changes in intake pressure are substantially linear as stated before, and because the relation of datum lever 125 movements to angular movement of the cam 105 are substantially linear as indicated by line A—K of Fig. 20, it follows that the contour of cam 105 must be shaped as shown in order to provide for pressure selections according to line F—G—H of Fig. 20. Therefore the idle pin 260 is placed between cam 105 and lever 83. Pin 260 is carried by an arm 262 extending from a hub 263 journalled on a rod 264 screw-threadedly connected at 265 with housing 2. Pin 260 is of such small diameter that it can follow the cam 105 and impart to the lever 83 the movement determined by the cam.

In order to be able to make a safe landing when the aneroid 88 is disrupted, it is necessary to move the throttle lever F and datum lever 125 into such position that a negative pressure of —6" will be selected. This is accomplished by part 105a of cam 105 when moved clockwise from the position shown in Fig. 5, engages and moves a pin 261 on arm 262 to the right to cause pin 260 to move the upper end of lever 83 to the right of its normal idle position. Fig. 20 shows that, when the datum lever 125 has moved —x degrees (or back of its normal idle position), the pressure selection is —6 inches. This feature provides for movement of the throttle by a controller with disrupted aneroid to substantially closed position as the airplane descends to ground level. As the movement of throttle lever F and the datum lever 125 from normal idle position to the —6" pressure selecting position is limited, it is advantageous to multiply the motion from the cam 105 to lever 83 by double pin and lever mechanism described, otherwise that portion of the cam 105 required to move the lever 83 from normal idle to negative pressure selecting position would be excessively steep.

While the embodiment of the present invention as herein disclosed, constitutes a preferred form, it is to be understood that other forms might be adopted, all coming within the scope of the claims which follow.

What is claimed is as follows:

1. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movement of the second member in one direction from normal position to increase one of the power output factors to a value above the normal schedule and by movement of the second member in the opposite direction from normal position to decrease one of the power output factors to a value below the normal schedule while the first manually operable member remains in set position and means actuated by the movement of the first manually operable member to a certain low pressure position for nullifying the effect of the second manually operable member to increase a power output factor above the normal schedule while the second manually operable member remains in the power output factor increasing position 2. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movement of the second member in one direction from normal position to increase one of the power output factors to a value above the normal schedule and by movement of the second member in the opposite direction from normal position to decrease one of the power output factors to a value below the normal schedule while the first manually operable member remains in set position and means actuated by movements of the first manually operable member to a certain high pressure position for nullifying the effect of the second manually operable member to increase a power output factor above the normal schedule while the second manually operable member remains in the power output factor increasing position.

3. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movement of the second member in one direction for normal position to increase one of the power output factors to a value above the normal schedule and by movement of the second member in the opposite direction from normal position to decrease one of the power output factors to a value below the normal schedule while the first manually operable member remains in set position within a range of low pressure settings and a certain limited range of high pressure settings, means actuated by movements of the first manually operable member to a certain low pressure setting for nullifying the effect of the second manually operable member to increase a power output factor above the normal schedule while the second manually operable member remains in a position away from normal and means actuated by movement of the first manually operable member to a certain high pressure setting for nullifying the effect of the second manually operable member to increase a power output factor above the normal schedule while the second manually operable member remains in the power output factor increasing position 4. Apparatus for controlling the power output of a supercharged internal combustion engine, comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuatable, when the position of the first manually operable member is in a setting above a certain low pressure setting, by movement of the second manually operable member in one direction from normal position to increase one of the power output factors to a value above the normal schedule and by movement of the second member in the opposite direction from normal position to decrease one of the power output factors to a value below the normal schedule while the setting of the first manually operable member remains fixed and means operable by the first manually operable member to a certain low pressure position for nullifying the effect of the second manually operable member to increase a power output factor above the normal schedule while the second manually operable member remains in the power output factor increasing position.

5. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuatable, when the position of the first manually operable member is in a setting below a certain high pressure setting, by movement of the second manually operable member in one direction from normal position to increase one of the power output factors to a value above the normal schedule and by movement of the second member in the opposite direction from normal position to decrease one of the power output factors to a value below the normal schedule, while the setting of the first manually operable member remains fixed and means operable by the first manually operable member to a certain high pressure position for nullifying the effect of the second manually operable member to increase a power output factor above the normal schedule while the second manually operable member remains in the power output factor increasing position.

6. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for determining the governed engine speed in predetermined relation to pressure selection whereby movement of the manually operable member controls the pressure and speed factors of engine power output according to a predetermined schedule, a second manually operable member, means actuatable, when the position of the first manually operable member is in a setting above a certain low pressure setting and below a certain high pressure setting, by movement of the second manually operable member in one direction from normal position to increase one of the power output factors to a value above the normal schedule and by movement of the second member in the opposite direction from normal position to decrease one of the power output factors to a value below the normal schedule while the setting of the first manually operable member remains fixed, and means operable by the first manually operable member to a certain low pressure position for nullifying the effect of the second manually operable member to increase a power output factor above the normal schedule while the second manually operable member remains away from normal position and means operable by the first manually operable member to a certain high pressure position for nullifying the effect of the second manually operable member to increase a power output factor above the normal schedule while the second manually operable member remains in the power output factor increasing position.

7. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a certain range above the lowest pressure selecting position thereof, for causing a movement of the cam to increase the pressure selection in response to movement of the second manually operable member in one direction away from normal and to decrease the pressure selected in response to movement of the second manually operable member in the opposite direction away from normal while the setting of the first manually operable member remains unchanged and means operated by movement of the first manually operable member to a certain low pressure selecting position for nullifying the effect of the second manually operable member to increase the pressure selection, while the second manually operable member remains in a position for increasing the pressure selection.

8. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a certain range below the highest pressure selecting position thereof, for causing a movement of the cam to increase the pressure selection in response to movement of the second manually operable member in one direction away from normal and to decrease the pressure selecting in response to movement of the second manually operable member in the opposite direction away from normal while the setting of the first manually operable member remains unchanged and means operable by movement of the first manually operable member to a certain high pressure selecting position for nullifying the effect of the second manually operable member to increase the pressure selection, while the second manually operable member remains in a position for increasing the pressure selection.

9. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a range intermediate the two extremes of its pressure selecting positions, for causing a movement of the cam to increase the pressure selection in response to movement of the second manually operable member in one direction away from normal and to decrease the pressure selection in response to movement of the second manually operable member in the opposite direction away from normal while the setting of the first manually operable member remains unchanged and means actuated by movement of the first manually operable member either to a certain low pressure selecting position or to a certain high pressure selecting position for nullifying the effect of the second manually operable member to increase the pressure selection, while the second manually operable member remains in a position for increasing the pressure selection.

10. Apparatus for controlling the power output of a supercharged internal combustion engine comprising a manually operated member, means adjusted thereby for controlling the engine speed and fuel intake pressure factors of power output according to a predetermined schedule and means operable while the manually operated member remains in a set position for effecting a decrease in value of one of the power output factors below the normal schedule.

11. Apparatus for controlling the power output of a supercharged internal combustion engine comprising a manually operated member, means adjusted thereby for controlling the engine speed and fuel intake pressure factors of power output according to a predetermined schedule and means operable while the manually operated member remains in a set position for effecting a decrease in the pressure factor while the engine speed factor remains as set by the manually operable member.

12. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member and means actuated by movement of the second manually operable member from a normal position for decreasing the value of one of the engine power factors while the setting of the first manually operable member remains fixed.

13. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for determining the governed engine speed in predetermined relation to pressure selection whereby movement of the manually operable member controls the pressure and speed factors of engine power output according to a predetermined schedule, a second manually operable member and means actuated by movement of the second manually operable member from a normal position for decreasing the pressure selection effected by the first manually operable member while the setting thereof remains fixed.

14. Apparatus for controlling the power output of a supercharged internal combustion engine comprising a throttle valve for controlling the engine fuel intake, a manually operable member for operating the throttle valve, a servo motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member and means operated thereby for causing a movement of the cam to decrease the pressure selection while the setting of the first manually operable member remains fixed.

15. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, a rotatable shaft supporting the cam, means under the control of engine intake pressure and the cam for controlling the operation of the servo-motor in order to effect such movement of the throttle valve as to maintain a selected pressure, means operated by the manually operated member for rotating the pressure selecting cam, a second manually operable member and a second rotatable shaft eccentrically supporting said cam shaft and rotated by the second manually operable member for causing a movement of the cam to decrease the pressure selection while the setting of the first manually operable member remains fixed.

16. Mechanism for controlling the intake pressure of a supercharged internal combustion engine comprising a throttle valve which directly controls said intake pressure as the valve is moved to different positions, a control member for determining a pressure to be maintained, automatic means for positioning the valve to maintain the pressure determined by the setting of said control member including a fluid operated servo-motor for moving the valve, a passage for conveying fluid under pressure to said servo motor, a second passage for by-passing some of the fluid under pressure around said servo-motor and a valve responsive to the viscosity of the pressure fluid to variably restrict said passage in accordance with variations in viscosity.

17. A controller for supercharged internal combustion engines, a servo-motor having a movable operating member, a variably positioned device for selecting the intake pressure to be maintained, a main control member for operating the pressure selector and for imparting to the engine throttle valve an increasing opening movement as the pressure selection increases, the pressures obtainable by opening the throttle being less than the selected pressure, means under the control of the pressure selecting device and responsive to engine intake pressure for determining the travel of the servo-motor member necessary to locate the throttle in that position of opening required to maintain the selected pressure, a differential lever connected with the throttle and having a floating fulcrum positioned by the servo-motor member, and means actuated by the main control member for transmitting motion through the differential lever to the throttle valve, said means providing a variable control of the movement of the differential lever when its floating fulcrum is moved by the servo-motor member such that the throttle valve is moved, at critical altitude, substantially to wide open position throughout the major portion of the range of pressure selections required during flight.

18. A controller for supercharged internal combustion engines, a servo-motor having a movable operating member, a variably positioned device for selecting the intake pressure to be maintained, a main control member for operating the pressure selector and for imparting to the engine throttle valve an increasing opening movement as the pressure selection increases, the pressures obtainable by opening the throttle being less than the selected pressures, means under the control of the pressure selecting device and responsive to engine intake pressure for determining the travel of the servo-motor member necessary to locate the throttle in that position of opening required to maintain the selected pressure, a differential lever connected with the throttle and having a floating fulcrum positioned by the servo-motor member, and means actuated by the main control member for transmitting motion through the differential lever to the throttle valve, said means providing a variable fulcrum for an arm of the differential lever such that when the differential lever is moved by the servo-motor member, the movement which is transmitted by the differential lever to the throttle valve will be the movement required to bring the throttle valve, at critical altitude, substantially to wide open position throughout the major portion of the range of pressure selections required during flight.

19. A controller for supercharged internal combustion engines, a servo-motor having a movable operating member, a variably positioned device for selecting the intake pressure to be maintained, a main control member for operating the pressure selector and for imparting to the engine throttle valve an increasing opening movement as the pressure selection increases, the pressures obtainable by opening the throttle being less than the selected pressures, means under the control of the pressure selecting device and responsive to engine intake pressure for determining the travel of the servo-motor member necessary to locate the throttle in that position of opening required to maintain the selected pressure, a differential lever connected with the throttle and having a floating fulcrum position by the servo-motor member, and means actuated by the main control member for transmitting motion through the differential lever to the throttle valve, said means comprising cam and contactor elements one of which is connected with the main control member and the other of which is carried by the differential lever said means providing a variable fulcrum for an arm of the differential lever such that when the differential lever is moved by the servo-motor member, the movement which is transmitted by the differential lever to the throttle valve will be the movement required to bring the throttle valve, at critical altitude, substantially to wide open position throughout the major portion of the range of pressure selections required during flight.

20. A controller for supercharged internal combustion engines, a servo-motor having a movable operating member, a variably positioned device for selecting the intake pressure to be maintained, a main control member for operating the pressure selector and for imparting to the engine throttle valve an increasing opening movement as the pressure selection increases, the pressures obtainable by opening the throttle being less than the selected pressures, means under the control of the pressure selecting device and responsive to engine intake pressure for determining the travel of the servo-motor member necessary to locate the throttle in that position of opening required to maintain the selected pressure, a differential lever connected with the throttle and having a floating fulcrum positioned by the servo-motor member, and means actuated by the main control member for transmitting motion through the differential lever to the throttle valve, said means comprising a lever actuated by the main control member and carrying a cam contactor element and comprising a cam element provided by an arm of the differential lever the cam and contactor elements providing a variable fulcrum for an arm of the differential lever such that when the differential lever is moved by the servo-motor member, the movement which is transmitted by member, the differential lever to the throttle valve will be the movement required to bring the throttle valve, at critical altitude, substantially to wide open position throughout the major portion of the range of pressure selections required during flight.

21. A controller for supercharged internal combustion engines, a servo-motor having a movable operating member, a variably positioned device for selecting the intake pressure to be maintained, a main control member for operating the pressure selector and for imparting to the engine throttle valve an increasing opening movement as the pressure selection increases, the pressures obtainable by opening the throttle being less than the selected pressures, means under the control of the pressure selecting device and responsive to engine intake pressure for determining the travel of the servo-motor member necessary to locate the throttle in that position of opening required to maintain the selected pressure, a differential lever connected with the throttle and having a floating fulcrum positioned by the servo-motor member, a second lever actuated by the main control member and carrying a cam contactor, means supporting the servo-motor-actuated fulcrum of the differential lever for orbital movement about the axis of the second lever, and a cam slot provided by the differential lever for receiving the cam contactor whereby motion is transmitted from the main control member through the differential lever to the throttle valve said cam slot having a contour providing a variable fulcrum for an arm of the differential lever such that when the differential lever is moved by the servo-motor member, the movement which is transmitted by the differential lever to the throttle valve will be the movement required to bring the throttle valve, at critical altitude, substantially to wide open position throughout the major portion of the range of pressure selections required during flight.

22. A controller for supercharged internal combustion engines comprising a main control member, a servo-motor having a movable operating member, means operated by both members for imparting movement to the throttle valve, said means including a servo-motor control element, means responsive to engine intake pressure for moving said element, and pressure selecting means actuated by the main control member for moving said element whereby the element is positioned by pressure selection to effect movement of the servo-motor member to move the valve to a position for obtaining a selected pressure and whereby the element is positioned by the intake-pressure-responsive means for effecting cessation of movement of the servo-motor member when the selected pressure is maintained, said pressure selecting means including a cam operated by the main control member and means for transmitting motion from the cam to the element, said last named means including provisions for multiplying the motion imparted by the cam to the element during a portion of the movement of the cam.

23. A controller for supercharged internal combustion engines comprising a main control member, a servo-motor having a movable operating member, means operated by both members for imparting movement to the throttle valve, said means including a servo-motor control element, means responsive to engine intake pressure for moving said element, and pressure selecting means actuated by the main control member for moving said element whereby the element is positioned by pressure selection to effect movement of the servo-motor member to move the valve to a position for obtaining a selected pressure and whereby the element is positioned by the intake-pressure-responsive means for effecting cessation of movement of the servo-motor member when the selected pressure is maintained, said pressure selecting means including a cam operated by the main control member and means for transmitting motion directly from the cam to the element and including a motion multiplying lever through which motion is indirectly transmitted to the element during a portion of the movement of the cam.

24. A controller for supercharged internal combustion engines comprising a main control member, a servo-motor having a movable operating member, means operated by both members for imparting movement to the throttle valve, said means including a servo-motor control element, means responsive to engine intake pressure for moving said element, and pressure selecting means actuated by the main control member for moving said element whereby the element is positioned by pressure selection to effect movement of the servo-motor member to move the valve to a position for obtaining a selected pressure and whereby the element is positioned by the intake-pressure-responsive means for effecting cessation of movement of the servo-motor member when the selected pressure is maintained, said pressure selecting means including a cam operated by the main control member, a device located immediately between the cam and element for transmitting motion directly from the cam to the element, a second device actuated by the cam during certain movement thereof, and means for so transmitting movement from the second device to the first device that movement of the first device is greater than the movement of the second device.

25. A controller for supercharged internal combustion engines comprising a main control member, a servo-motor having a movable operating member, means operated by both members for imparting movement to the throttle valve, said means including a servo-motor control element, means responsive to engine intake pressure for moving said element, and pressure selecting means actuated by the main control member for moving said element whereby the element is positioned by pressure selection to effect movement of the servo-motor member to move the valve to a position for obtaining a selected pressure and whereby the element is positioned by the intake-pressure-responsive means for effecting cessation of movement of the servo-motor member when the selected pressure is maintained, said pressure selecting means including a cam operated by the main control member, a pin located immediately between the cam and element for transmitting motion directly from the cam to the element, a second pin actuated by the cam during certain movement thereof and a lever carrying both pins and having its pivot located closer to the second pin than to the first pin whereby actuation of the second pin by the cam effects greater linear motion of the first pin.

26. Apparatus for controlling the power output of a supercharged internal combustion engine comprising, in combination, a manually adjustable lever movable to different positions to control engine speed and pressure, a member operated thereby for selecting a pressure to be maintained in the fuel induction passage, means for maintaining the pressure selected, means also operated by said lever for controlling the engine speed so that the lever is effective to regulate the power output of the engine according to a predetermined schedule, and means operable while the manually operable lever and speed controlling means remain set in an adjusted position for moving the pressure selecting member to effect either an increase or decrease in pressure selection so as to vary the normal power schedule.

27. Apparatus for controlling the power output of a supercharged internal combustion engine comprising, in combination, a manually adjustable lever movable to different positions to control engine speed and pressure, a member operated thereby for selecting a pressure to be maintained in the fuel induction passage, means for maintaining the pressure selected, means also operated by said lever for controlling the engine speed so that the lever is effective to regulate the power output of the engine according to a predetermined schedule, a second manually operable lever and means operable by said lever, while the first manually operable lever and speed controlling means remain set in an adjusted position, for moving the pressure selecting member to effect either an increase or decrease in pressure selection so as to vary the normal power schedule.

28. Apparatus for controlling the power output of a supercharged internal combustion engine comprising a throttle valve for controlling the engine intake, a pressure selecting cam, means for controlling the engine speed, a manually adjustable member operable to adjust the throttle and cam to select a pressure to be maintained and to operate said speed controlling means, a servo motor for operating the throttle, means controlled by said cam and intake pressure for controlling the operation of the servo motor to effect movements of the throttle necessary to maintain the pressure selected by said cam, a second manually operable member and means operable by said last named member to move said cam either in a direction to increase the pressure selection, or in a direction to decrease the pressure selection while the setting of the first manually operable member and of the speed controlling means remains fixed.

29. Apparatus for controlling the power output of a supercharged internal combustion engine comprising an adjustable throttle valve for controlling engine intake pressure, an adjustable member for selecting a pressure to be maintained in said engine intake, means for maintaining the selected pressure, means for controlling the engine speed, a manually operable member for operating the throttle, the pressure selecting member and speed controlling means whereby movement of the manually operable member controls both the pressure and speed factors of engine power output according to a predetermined schedule, a second manually operable member and means operated by movement of said last named member for moving the pressure selecting member to increase or decrease the pressure selected by the pressure selecting member when positioned by the first manually operable member while the setting of said first manually operable member and the speed controlling means remains fixed.

CLARENCE H. JORGENSEN.
WILLIAM H. TAYLOR.

REFERENCES CITED

The following references are of record in the file of this patent:

UNITED STATES PATENTS

| Number | Name | Date |
|---|---|---|
| 1,995,800 | Dodson | Mar. 26, 1935 |
| 2,115,485 | Dodson | Apr. 26, 1938 |
| 2,205,354 | Gregg, et al. | June 18, 1940 |
| 2,217,364 | Halford et al. | Oct. 8, 1940 |